United States Patent [19]

Orloff

[11] 4,000,755
[45] Jan. 4, 1977

[54] FLUID FLOW CONTROL VALVES
[75] Inventor: George Orloff, Solihull, England
[73] Assignee: Lucas Industries Limited, Birmingham, England
[22] Filed: Feb. 26, 1976
[21] Appl. No.: 661,418
[30] Foreign Application Priority Data
Mar. 7, 1975 United Kingdom ............ 9512/75
[52] U.S. Cl. ............................................. 137/595
[51] Int. Cl.² ...................................... F16K 11/14
[58] Field of Search ......................... 137/595, 637
[56] References Cited
UNITED STATES PATENTS
1,388,785 8/1921 Acker .......................... 137/595 X
2,380,827 7/1945 Downs .......................... 137/595 X Primary Examiner—Robert G. Nilson

[57] ABSTRACT

A valve for simultaneous control of two fluid flows has two control elements linearly movable along parallel axes. The control elements pivotally engage opposite ends of a lever, and the lever is itself pivotally mounted on a part which is linearly movable to lift the control elements. The pivotal interconnection between the lever and the linearly-movable part can be locked by application of an electric control current. Locking can be effected by means of an electro-magnet or by interposing between the lever and the part a liquid whose viscosity is increased by the control current.

12 Claims, 8 Drawing Figures

FLUID FLOW CONTROL VALVES

This invention relates to fluid flow control valves.

According to the invention a fluid flow control valve comprises a body having first and second inlets and first and second outlets, first and second control elements respectively movable to control flow between said first inlet and outlet, and between said second inlet and outlet, a linkage element interconnecting said control elements, a part movable in response to an external control signal and pivotally connected to said linkage element, and locking means, responsive to an electrical operating signal, for restraining said linkage element from pivotal movement relative to said part, so as to prevent relative movement between said control elements.

Embodiments of the invention will now be described by way of example only, and with reference to the accompanying drawings, in which.

Figure 1:
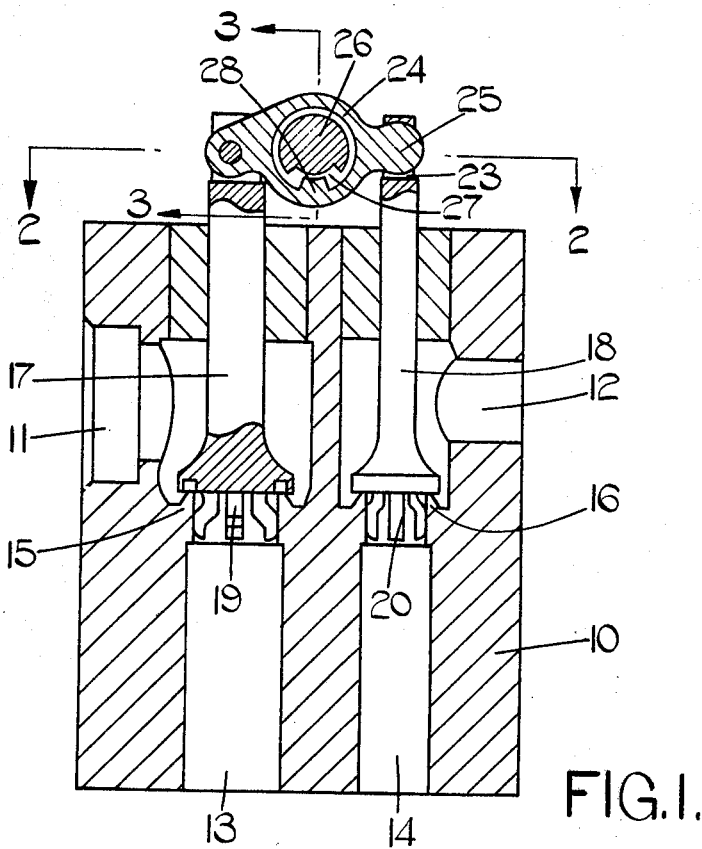
FIG. 1 is a section through a fluid control valve.
Figures 2, 3:
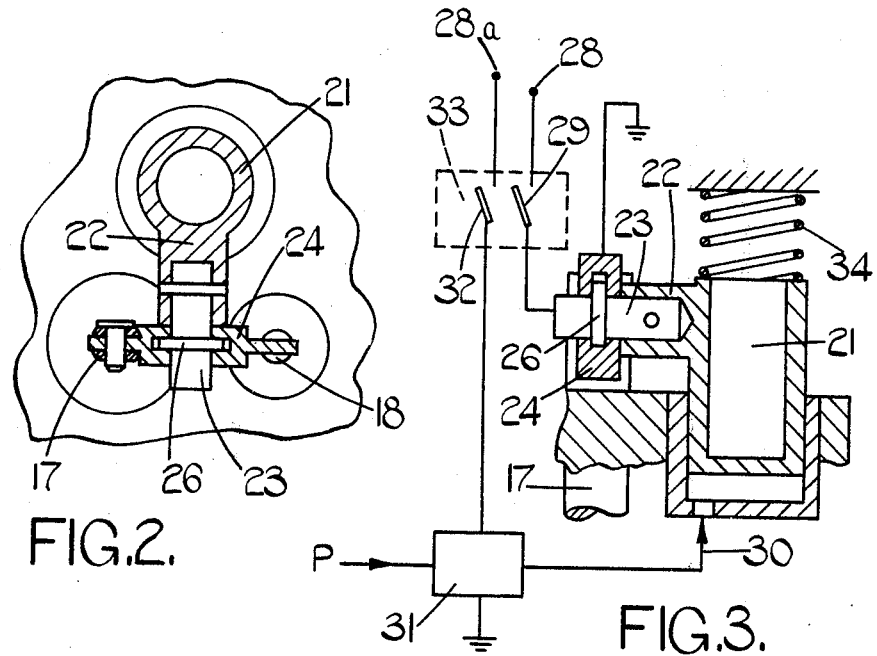
FIGS. 2 and 3 are sections on the corresponding lines in FIG. 1.

The valve shown in FIGS. 1 to 3 has a body 10 having a first inlet 11, a second inlet 12, a first outlet 13 and a second outlet 14. Between inlet 11 and outlet 13 is a valve seat 15 defined by the body 10. A similar valve seat 16 is defined by the body 10 between inlet 12 and outlet 14.

Valve control elements 17, 18 are slidable in the body 10 along mutually parallel axes so as to be movable towards and away from the respective seats 15, 16. Elements 17, 18 include respective guide portions 19, 20 slidable within the seats 15, 16. Elements 17, 18 are responsive to the pressures in the respective inlets 11, 12, increases in these pressures urging elements into sealing engagement with the seats 15, 16 to isolate the inlets 11, 12 from the outlets 13, 14.

Elements 17, 18 are movable against the inlet pressures by an actuating arrangement which includes a piston 21 movable by a control pressure signal, the axis of movement of piston 21 being parallel to the axes of movement of the elements 17, 18. Piston 21 is responsive to the aforesaid control pressure signal to move upwardly, as seen in FIGS. 1 to 3.

Piston 21 includes a transversely-extending portion 22, within which a stem 23 is securely pinned. Control elements 17, 18 are interconnected by a linkage in the form of a lever 24 which is pin-jointed within a clevis on element 17 and has a radiused end 25 engaging a socket on element 18. Stem 23 extends sealingly through lever 24 and has a portion 26 which lies within a chamber 27 defined by lever 24, the portion 26 having a radial clearance within chamber 27. Lever 24 has a projection 28 extending internally of chamber 27 and co-operating with a cut-out in portion 26 of stem 23, to define two zones of the chamber 27 so that pivotal movement of lever 24 on stem 23 is accompanied by displacement of a liquid between the two zones of chamber 27, around the clearance zone between the latter and portion 26.

The chamber 27 is filled with an electro-viscous liquid, that is a liquid whose viscosity may be increased by the application of a high tension voltage aross a film of the liquid. An example of such a liquid is porous silicon kerosene, marketed by Warner Electric Brake & Clutch Company under the designation Warner 127RE.

The stem 23 is electrically insulated from the lever 24, conveniently by means of elastomeric sealing lips on the lever 24, which also serve to prevent the escape of the liquid within chamber 27. Lever 24 is connected to earth and stem 23 is connected to a high voltage supply 28 via a switch 29.

Piston 21 is movable in a direction to open the valve by a pressure signal P applied on a line 30 and controlled by an electro-hydraulic valve 31. Valve 31 is connected to low voltage supply 28a via a further switch 32.

Switches 29, 32 form part of a control device, indicated at 33, and are operatively interconnected so that switch 29 is always closed before switch 32, thereby ensuring that the viscosity of the liquid in chamber 27 is always increased before the elements 17, 18 are moved by piston 21 in a direction to open the valve.

In use, when switches 29, 32 are open, piston 21 is urged downwardly by a spring 34, this downward movement being assisted by the pressures in the inlets 11, 12, until the elements 17, 18 engage the respective seats 15, 16. Lever 24 can pivot freely on stem 23 and elements 17, 18 can thus move relatively, so as sealingly to engage their respective seats 15, 16. Closure of switch 29 causes the viscosity of the liquid in chamber 27 to be increased to a level at which pivotal movement of lever 24 on stem 23 is prevented. Subsequent closure of switch 32 causes piston 21 to move in a direction to open the valve. Elements 17, 18 thus always move in unison, and the flow to the outlets 13, 14 may have a predetermined ratio.

Figure 4:
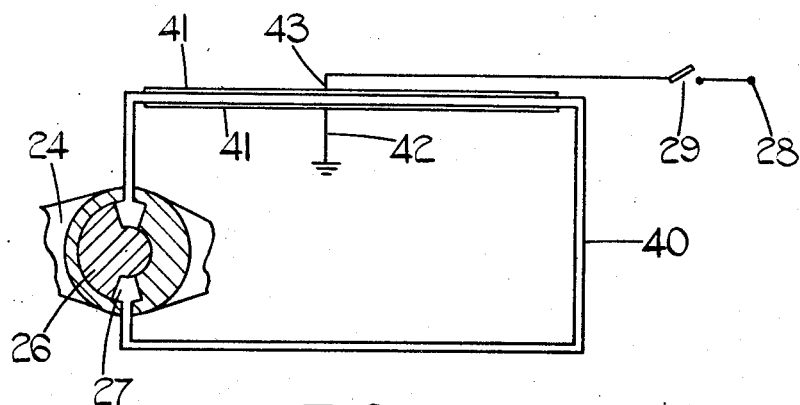
FIGS. 4,5,6,7 and 8 show modified forms of the pivotal connection and locking means shown in FIGS. 1 to 3.

FIG. 4 shows a modification of the pivotal interconnection of the lever 24 and the stem 23, in a manner which avoids the necessity of insulating these parts electrically from each other. In this modification the stem portion 26 does not have a radial clearance within the lever 24, but fluid displaced as a result of pivotal movement passes externally of lever 24 by way of a conduit 40, which includes a portion defined between a pair of parallel, flat, mutually-insulated plates 41. Extending insulatingly through the plates 41 are electrodes 42, 43 respectively connected to earth and to the voltage source 28 via switch 29. Switch 29 is arranged, as above described, to be closed before the piston 21 starts to open the valve, and an electro-viscous liquid in chamber 27 and conduit 40 then prevents relative movement between lever 24 and stem 23.

Figure 5:
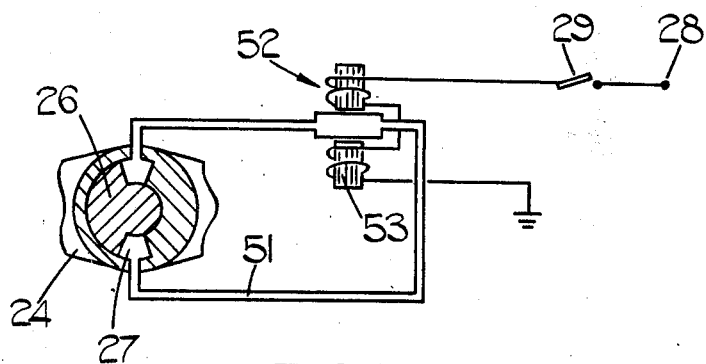

FIG. 5 shows a variant of the arrangement shown in FIG. 4. Liquid displaced as a result of pivotal movement of lever 24 on stem 23 passes via a conduit 51. The liquid in chamber 27 and conduit 51 is, in this case however, a ferro-hydrodynamic liquid, that is a suspension of magnetisable particles in a liquid, whereby application of a magnetic field to the liquid causes the particles to coalesce and prevent flow. A coil 52 is wound about a core 53 so that a part of conduit 51 lies in a gap of the core 53. Coil 52 may be energised, by means of switch 29, as before.

Figure 6:
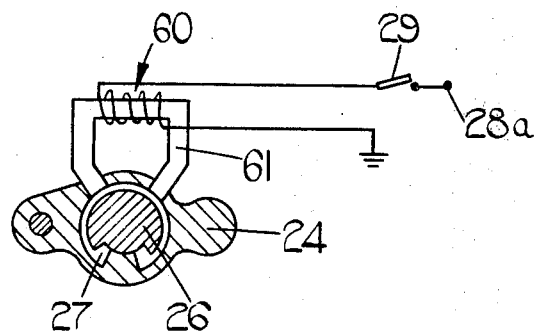

FIG. 6 shows a modification of the lever 24 of FIG. 1. A coil 60 is wound about a core 61, a part of the radial clearance passage between the lever 24 and portion 26 of stem 23 lying within a gap in the core 61. Chamber 27 is filled with a ferrohydrodynamic liquid, so that energisation of coil 60 prevents liquid displacement with chamber 27 and hence prevents lever 24 from pivotting on stem 23.

The arrangements described above have the effect that control elements 17, 18 can be made to lift in unison, without the provision of close manufacturing tolerances on the several parts of the valve, or of the interconnections between these parts. The described arrangements do not, however, accommodate any requirement for lever 24 to pivot about axes which are perpendicular to the axis of stem 23.

Figure 7:
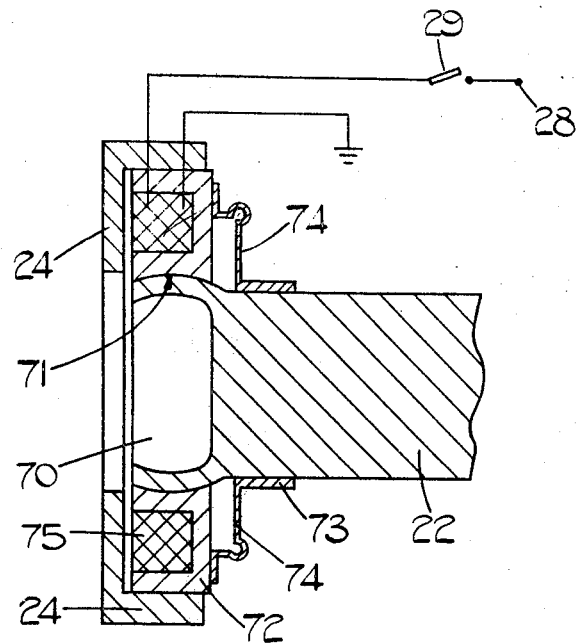

FIG. 7 shows a pivot arrangement which can accommodate the last-mentioned pivotal movements. The portion 22 of piston 21 has its end formed as a cup 70 having a part-spherical outer surface 71. An element 72 of magnetically permeable material surrounds the cup 70 and has an internal part-spherical surface engaging the surface 71.

Element 72 is restrained against rotation about the axis of portion 22 by a spider 73 which is secured to portion 22 and which has a plurality of flexible arms 74 of thin metal, the arms 74 being secured to element 72. Arms 74 permit element 72 to pivot on cup 70 about axes which are perpendicular to the pivotal axis of lever 24 on element 72.

Within element 72 is a coil 75 which can be energised via switch 29. Lever 24 surrounds element 72 and is pivotally movable thereon about the axis of part 22. Lever 24 is of magnetic material and forms an armature so that when coil 75 is energised lever 24 can no longer pivot about the axis of element 72, which remains free to pivot about axes normal to the axis of part 22.

Figure 8:
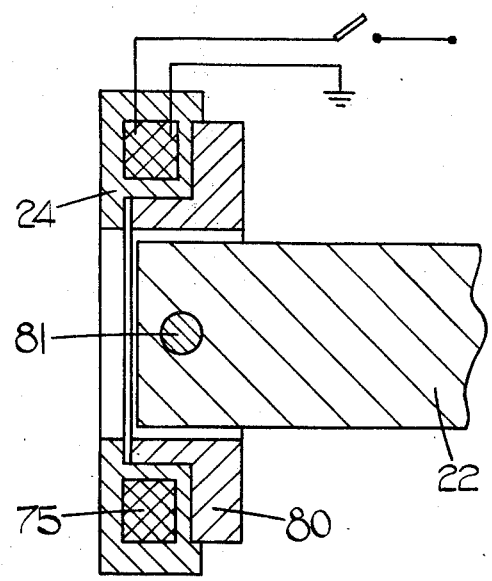

FIG. 8 shows a modification of the arrangement of FIG. 7. In this modification the coil 75 is located within the lever 24. Lever 24 is pivotally supported on a magnetically permeable member 80 which is itself pivotally mounted on the portion 22 by a pin 81. In this modification the member 80 has only one axis of pivotal movement, but it will readily be apparent that a gimbal arrangement could be provided by a ring interposed between the member 80 and portion 22 and pivoted thereon about respective mutually perpendicular axes.

It will be understood that the arrangements shown in FIGS. 7 and 8 may be further modified so that coil 75 may be dispensed with, and lever 24 and element 72 arranged to define a chamber which may be filled with an electro-viscous liquid or a ferrohydrodynamic liquid, as above described, pivotal movement of lever 24 about element 72 being accompanied by displacement of this liquid. Closure of switch 29 will, as previously disclosed, operate to prevent this last pivotal movement.

I claim:

1. A fluid flow control valve comprising a body having first and second inlets and first and second outlets, first and second control elements respectively movable to control flow between said first inlet and outlet, and between said second inlet and outlet, a linkage element interconnecting said control elements, a part movable in response to an external control signal and pivotally connected to said linkage element, and locking means, responsive to an electrical operating signal, for restraining said linkage element from pivotal movement relative to said part, so as to prevent relative movement between said control elements.

2. A valve as claimed in claim 1 in which said part and said linkage element define two volumes between which a fluid can be displaced as a result of relative pivotal movement between said part and said linkage element, a passage interconnecting said volumes, and a liquid substantially filling said volumes and said passage, said liquid being responsive to said electrical operating signal to resist displacement by said relative pivotal movement.

3. A valve as claimed in claim 2 in which said passage is defined between said part and said linkage element.

4. A valve as claimed in claim 2 in which said passage extends externally of said linkage element.

5. A valve as claimed in any of claim 2 in which said liquid is an electro-viscous liquid, and there is provided a pair of electrodes for applying said electrical signal to said liquid.

6. A valve as claimed in claim 5 in which said part and said linkage element form said electrodes.

7. A valve as claimed in claim 5 in which electrodes comprise a pair of mutually-insulated plates on opposite sides of a portion of said passage.

8. A valve as claimed in any of claim 2 in which said liquid is a ferrohydrodynamic liquid, and there is provided an electro-magnet, energisable by said electrical signal, for applying a magnetic field to a part of said liquid.

9. A valve as claimed in claim 1 which includes an electro-magnet carried by said part, and in which said linkage element is of a magnetically permeable material.

10. A valve as claimed in claim 9 in which said electro-magnet is mounted on said part for pivotal movement about an axis substantially perpendicular to the axis of pivotal movement of said linkage element relative to said part.

11. A valve as claimed in claim 1 which includes an electro-magnet carried by said linkage element and a magnetically permeable member on said part, said linkage element being pivotally mounted on said permeable member.

12. A valve as claimed in claim 11 in which said permeable member is mounted on said part for pivotal movement about an axis substantially perpendicular to the axis of pivotal movement of said linkage element on said permeable member.

* * * * *

UNITED STATES PATENT AND TRADEMARK OFFICE
CERTIFICATE OF CORRECTION

PATENT NO. : 4,000,755

DATED : January 4, 1977

INVENTOR(S) : GEORGE ORLOFF

It is certified that error appears in the above-identified patent and that said Letters Patent are hereby corrected as shown below:

Column 4, line 23, delete "any of";

Column 4, line 32, delete "any of".

Signed and Sealed this

Third Day of May 1977

[SEAL]

Attest:

RUTH C. MASON
*Attesting Officer*

C. MARSHALL DANN
*Commissioner of Patents and Trademarks*